United States Patent Office 3,448,114
Patented June 3, 1969

3,448,114
AROYLALKYL DERIVATIVES OF 1,2,3,4-TETRA-HYDRO-5H-PYRIDO[4,3b]INDOLES
Robert Phillip Johnson and John Paul Oswald, Waukegan, Ill., assignors to Abbott Laboratories, North Chicago, Ill., a corporation of Illinois
No drawing. Filed Dec. 7, 1966, Ser. No. 599,748
The portion of the term of the patent subsequent to May 7, 1985, has been disclaimed
Int. Cl. C07d 57/06
U.S. Cl. 260—296    6 Claims

ABSTRACT OF THE DISCLOSURE

Aroylalkyl derivatives of 1,2,3,4-tetrahydro-5H-pyrido[4,3b]indoles, which are useful chemotherapeutic agents primarily through effects on the central nervous system of mammals.

This invention relates to aroylalkyl derivatives of 1,2,3,4-tetrahydro-5H-pyrido[4,3b]indoles, their ketal derivatives, their acid-addition salts, processes for their manufacture, and their use as medicinal agents.

More particularly, the invention relates to compounds of the formula

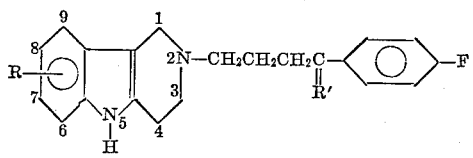

(A)

wherein R is hydrogen, fluorine, and lower alkoxy and R' is oxygen or ethylenedioxy. The term "lower alkoxy" includes the straight and branched alkoxy radicals containing from one to five carbon atoms, inclusive.

The compounds of this invention have been found to exhibit pharmacological activity, primarily through effects on the central nervous system of mammals, and are therefore useful chemotherapeutic agents. For example, the hydrochloride salt of the compound of Formula A wherein R is 8-fluoro and R' is oxygen has been found to be a potent sedative-tranquilizer with pronounced analgesic acitivy. Using the analgesic reaction time procedure of Eddy and Leimbach, J. Pharmacol. Exp. Therap., 1953, 107: 385–393, and the motor activity test of Dews. Brit. J. Pharmacol, 1953, 8: 46–48, it was found that this compound is active in both procedures, i.e., increasing reaction time and decreasing activity. The analegesia test employed a hot plate, the surface of which was maintained at a constant temperature. Male adult albino mice were individually dropped onto the surface of the plate confined by a bottomless beaker, and their reaction time to the warm surface was recorded. Groups of ten mice, preselected on the basis of three pretreatment control readings of 15 seconds or less, were utilized for the tests, which were conducted at 5, 15, 30, 60, and 120 minutes post-administration of the compound. Motor activity was assessed by determining the voluntary activity of groups of five male adult albino mice, which activity in an opaque plastic cage was recorded for 15 minutes by a centrally-mounted photocell that electrically activated a digital counter whenever the photobeam was broken. The compound was administered intravenously as a saline solution 15 minutes prior to testing.

The compounds of the present invention are prepared by allowing the appropriate 1,2,3,4-tetrahydro-5H-pyrido[4,3b]indole, unsubstituted in the 2-position, to react with 4 - (p - fluorophenyl) - 4,4 - ethylenedioxy - 1 - chlorobutane (the preparation of which is hereinafter described) in the presence of an acid acceptor to give the desired compound wherein R' is ethylenedioxy. The latter may be hydrolyzed under acidic conditions to produce the corresponding compound wherein R' is oxygen. The general reaction may be depicted as follows:

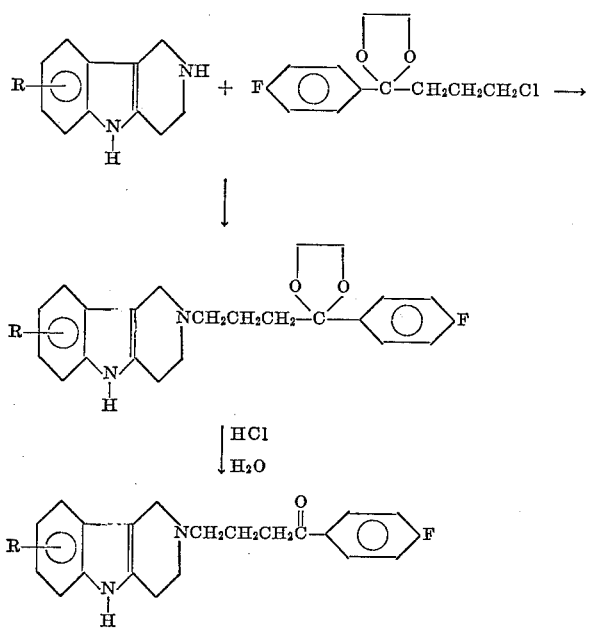

EXAMPLE 1

4-(p-fluorophenyl)-4,4-ethylenedioxy-1-chloro-butane (starting material)

In an appropriate reaction vessel are mixed 300 g. of γ-chloro-p-fluorobutyrophenone, 20 g. of p-toluenesulfonic acid hydrate, 130 g. of ethylene glycol, and 2.5 l. of benzene. This mixture is heated (stirring is optional) under reflux through an efficient water-separating device until water separation is compelte (12 to 18 hours is usually sufficient). The resultant solution is cooled and washed with several portions of a 5% aqueous solution of sodium carbonate. After a final wash with saturated aqueous sodium chloride, the organic solution is dried (anhydrous magnesium sulfate is suitable), filtered, and subjected to fractional distillation under reduced pressure. The product distills at 162°–166° (15 mm.) or 144°–147° (10 mm.) with a refractive index of $n_D{}^{25}=1.505$. This material is sufficiently pure for use as below. Further purification may be achieved by dissolving the product fraction in a volatile, water-insoluble solvent, such as diethyl ether, and washing this solution with several portions of water. The organic solution thus obtained is dried, filtered, and freed of the volatile solvent under vacuum. If desired, the product may then be redistilled for maximum purity.

EXAMPLE 2

2-[γ-(p-fluorobenzoyl)propyl]-1,2,3,4-tetrahydro-5H-pyrido[4,3b]indole hydrochloride (R=H, R'=0)

To a solution of 2.5 g. of 1,2,3,4-tetrahydro-5H-pyrido[4,3b]indole hydrochloride [R. Robinson and S. Thornley, J. Chem. Soc., 125, 2169 (1924)] and 3.4 g. of 4 - (p - fluorophenyl) - 4,4 - ethylenedioxy - 1 - chlorobutane (as prepared by the method of Example 1) in 100 ml. of dry dimethylformamide is added 1.9 g. of anhydrous potassium carbonate. After stirring at 84° for 22 hours, the reaction slurry is treated with an additional 3.0 g. of the organic chloride and 1.0 g. of potassium carbonate. After another 24 hours of stirring at 84°, the reaction mixture is devoid of the starting secondary amine, as assayed by thin-layer chromatography. The cooled mixture is diluted with water and extracted with several portions of diethyl ether. The combined ether solution is washed wtih water, dried, and filtered. The ether is removed under vacuum. A solution of the residue in aqueous methanol is acidified with hydrochloric acid and heated briefly. Addition of 2-propanol to the hot solution and cooling subsequently gives the white, crystalline product, M.P. 222°–223° (dec.).

EXAMPLE 3

2-benzyl-8-fluoro-1,2,3,4-tetrahydro-5H-pyrido[4,3b]indole hydrochloride

To a slurry of 34.0 g. (0.21 mole) of p-fluorophenylhydrazine hydrochloride in 450 ml. of 2-propanol and 63 ml. of concentrated hydrochloric acid is added 43.0 g. (0.23 mole) of 1-benzyl-4-piperidone. After 4.5 hours of heating under reflux, the hot solution is filtered. The collected solid is washed with 2-propanol, cold water, again with 2-propanol, and finally with hexane. This crude material, M.P. 234°–240° (dec.), is recrystallized from methanol-2-propanol or from methanol-water to give the pure crystalline product, M.P. 245.5°–246.5° (dec.).

EXAMPLE 4

8-fluoro-1,2,3,4-tetrahydro-5H-pyrido[4,3b]indole hydrochloride

A solution of 30.0 g. (0.095 mole) of 2-benzyl-8-fluoro-1,2,3,4-tetrahydro-5H-pyrido[4,3b]indole hydrochloride, prepared as described in Example 3, in aqueous ethanol is treated with hydrogen and a palladium on-carbon catalyst. When hydrogen uptake ceases, the catalyst is removed by filtration and washed thoroughly. The filtrate and washings are combined and freed of solvent under reduced pressure. Recrystallization from methanol-water of the crystalline residue affords the pure product, which does not melt but decomposes above 300° C.

EXAMPLE 5

2 - [4 - (p - fluorophenyl) - 4,4 - ethylenedioxy - 1 - butyl] -8 - fluoro - 1,2,3,4 - tetrahydro - 5 H - pyrido[4,3b]indole hydrochloride (R=8-fluoro, R'=ethylenedioxy)

A slurry of 5.0 g. of 8-fluoro-1,2,3,4-tetrahydro-5H-pyrido[4,3b]indole hydrochloride (as prepared by the method of Example 4), 6.4 g. of 4-(p-fluorophenyl)-4,4-ethylenedioxy-1-chlorobutane, 5.0 g. of potassium iodide, and 7.6 g. of anhydrous potassium carmbonate in 100 ml. of dry dimethylformamide is heated at 85° for four hours. The cooled slurry is distributed between water and methylene chloride. The aqueous phase is washed with several further portions of methylene chloride. The organic extracts are combined, washed with water, treated with decolorizing carbon and a drying agent, filtered, and concentrated under vacuum to a pale yellow oil. A solution of this base in 2-propanol is acidified with methanolic hydrogen chloride, precipitating the crystalline hydrochloride salt. This is collected and recrystallized from methanol-2-propanol to give the analytically pure compound, M.P. 189°–191° with decomposition.

EXAMPLE 6

2-[γ-(p-fluorobenzoyl)propyl]-8-fluoro-1,2,3,4-tetrahydro-5H-pyrido[4,3b]indole hydrochloride (R=8-fluoro, R'=0)

A hot solution of 2-[4-(p-fluorophenyl)-4,4-ethylenedioxy - 1 - butyl] - 8 - fluoro - 1,2,3,4 - tetrahydro - 5H- pyrido[4, 3b]indole hydrochloride (as prepared by the method of Example 4) (or the crude free base) in aqueous methanol is acidified with hydrochloric acid and heated briefly on a steam bath. Upon cooling, the solution deposits the crystalline product, which is collected and, if necessary, recrystallized from wet methanol-2-propanol. The pure product is a white crystalline solid, M.P. 212°–214° with decomposition. This decomposition range is approximate, since it varies with the rate of heating.

EXAMPLE 7

2-benzyl-8-methoxy-1,2,3,4-tetrahydro-5H-pyrido[4, 3b]indole hydrochloride

A slurry of 50.0 g. of p-methoxyphenylhydrazine hydrochloride in 700 ml. of 2-propanol is treated with 57.0 g. of 1-benzyl-4-piperidone and 90 ml. of concentrated hydrochloric acid. This slurry is heated and stirred under reflux for four hours. The resultant amber-colored solution is filtered while still warm to remove precipitated ammonium chloride. The filtrate is cooled and the crude crystalline product is isolated by filtration, washed with cold 2-propanol, and dried. This crude product is dissolved in a minimum of hot methanol containing a small amount of water. The solution is treated with decolorizing carbon and filtered hot. The filtrate is reheated and diluted with 2-propanol, then chilled. The crystalline product is collected, dried, and, if necessary, recrystallized in a similar fashion. The pure product melts at 216°–218° with decomposition.

EXAMPLE 8

8-methoxy-1,2,3,4-tetrahydro-5H-pyrido[4, 3b]indole hydrochloride

The 2-benzyl-8-methoxy derivative of Example 7 is subjected to catalytic debenzylation and the crude product isolated employing the method illustrated in Example 4. A final crystallization from a minimum quantity of hot water gives the pure, crystalline product, which does not melt but decomposes above 230°.

EXAMPLE 9

8-methoxy-2-(γ-[p-fluorobenzoyl]propyl)-1,2,3,4-tetrahydro-5H-pyrido[4, 3b]indole A slurry of 5.0 g. of 8-methoxy-1,2,3,4-tetrahydro-5H-pyrido[4, 3b]indole hydrochloride, prepared by the method of Example 8, and 7.6 g. of anhydrous potassium carbonate in 100 ml. of dimethylformamide is treated with 6.4 g. of 4-(p-fluorophenyl)-4,4-ethylenedioxy-1-chlorobutane and 5 g. of potassium iodide. This mixture is stirred at 80° for five hours, cooled, and diluted with water. The aqueous slurry is extracted with several portions of methylene chloride. The organic extracts are combined, washed with water, dried over magnesium sulfate, filtered, and freed of solvent under vacuum. The residue is dissolved in hot aqueous methanol acidified with hydrochloric acid and heated on a steam bath for 0.5 hour, then cooled. The crude hydrochloride salt of the product is collected by filtration and is then dissolved in a little methanol. This solution is made alkaline and diluted with water and methylene chloride. The methylene chloride extract is washed with water, dried over magnesium sulfate, filtered, and freed of solvent under vacuum. The crystalline residue is crystallized several times from methanol to give the pure product as the free base, M.P. 133°–135° with decomposition.

What is claimed is:
1. A compound of the formula

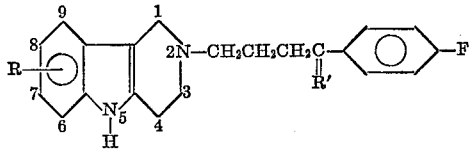

wherein R is selected from the group consisting of hydrogen and fluorine, and R' is oxygen, and acid-addition salts thereof.

2. The compound as claimed in claim 1 wherein R is 8-fluoro and R' is ethylene dioxy.

3. The compound as claimed in claim 1 wherein R is 8-fluoro and R' is oxygen.

4. The compound as claimed in claim 1 wherein R is hydrogen and R' is oxygen.

5. A compound of the formula

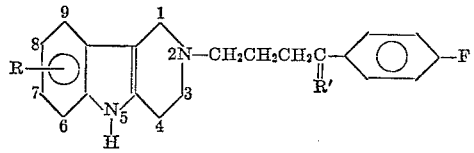

wherein R is selected from the group consisting of hydrogen and fluorine and R' is ethylenedioxy.

6. An acid-addition salt of the compounds of claim 1.

References Cited

UNITED STATES PATENTS 2,408,905  10/1946  Black et al. _____ 260—340.7 XR
2,993,056  7/1961   Segre et al. _____ 260—340.9 XR

OTHER REFERENCES

Wagner-Zook: Synthetic Organic Chemistry, Wiley (1953), pp. 666–669.

HENRY R. JILES, *Primary Examiner.*

A. L. ROTMAN, *Assistant Examiner.*

U.S. Cl. X.R.

424—274